(12) United States Patent
Keller (10) Patent No.: US 10,937,388 B2
(45) Date of Patent: Mar. 2, 2021

(54) ADAPTIVE POWER SUPPLY

(71) Applicant: INTERDIGITAL CE PATENT HOLDINGS, Paris (FR)

(72) Inventor: Anton Werner Keller, Arni (CH)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 10 days.

(21) Appl. No.: 16/246,493

(22) Filed: Jan. 12, 2019

(65) Prior Publication Data

US 2019/0221189 A1 Jul. 18, 2019

(30) Foreign Application Priority Data

Jan. 15, 2018 (EP) .................... 18305030

(51) Int. Cl.
| | |
|---|---|
| *G09G 5/10* | (2006.01) |
| *G09G 3/34* | (2006.01) |
| *G06F 1/3206* | (2019.01) |
| *G06F 1/3296* | (2019.01) |
| *H02M 1/42* | (2007.01) |
| *H02M 3/335* | (2006.01) |
| *H04N 5/57* | (2006.01) |
| *H04N 5/63* | (2006.01) |
| *H04R 3/00* | (2006.01) |

(52) U.S. Cl.
CPC .............. *G09G 5/10* (2013.01); *G06F 1/3206* (2013.01); *G06F 1/3296* (2013.01); *G09G 3/342* (2013.01); *H02M 1/42* (2013.01); *H02M 3/33569* (2013.01); *H04N 5/57* (2013.01); *H04N 5/63* (2013.01); *G09G 2320/0626* (2013.01); *G09G 2320/0646* (2013.01); *G09G 2320/0686* (2013.01); *G09G 2330/021* (2013.01); *H04R 3/00* (2013.01)

(58) Field of Classification Search
CPC ....... G09G 5/10; G06F 1/3206; G06F 1/3296; H02M 1/42; H04N 5/57; H04R 3/00
See application file for complete search history.

(56) References Cited

U.S. PATENT DOCUMENTS

| | | | |
|---|---|---|---|
| 8,373,399 B2 | 2/2013 | Yang et al. | |
| 8,446,040 B2 | 5/2013 | Paik et al. | |
| 8,884,541 B2 | 11/2014 | Wu | |
| 9,013,895 B2 * | 4/2015 | Baarman | H02J 7/025 |
| | | | 363/16 |
| 9,131,544 B2 | 9/2015 | Wu | |
| 2016/0225301 A1 * | 8/2016 | Scepanovic | G09G 3/36 |
| 2016/0380528 A1 | 12/2016 | Gao et al. | |
| 2017/0310224 A1 * | 10/2017 | Joo | G09G 3/3406 |

FOREIGN PATENT DOCUMENTS

| | | |
|---|---|---|
| WO | WO2010039419 | 4/2010 |
| WO | WO2018004552 | 1/2018 |

* cited by examiner

*Primary Examiner* — Kenneth B Lee, Jr.
(74) *Attorney, Agent, or Firm* — Patricia A. Verlangieri (57) ABSTRACT

A method and device are described to increase the light output on specific areas of a display. The display may be part of a High Dynamic Range (HDR) device. The device includes a processor and a power source. The processor is configured to process a received content signal. The power source further includes a circuit configured to receive a request signal from the processor and, in response to the received request signal, adjust the power supply limitation that increases a light output on a first area of a display when the content signal is displayed.

23 Claims, 6 Drawing Sheets

ADAPTIVE POWER SUPPLY

REFERENCE TO RELATED APPLICATION

This application claims priority from European Patent Application No. 18305030.1, entitled "ADAPTIVE POWER SUPPLY", filed on Jan. 15, 2018, the contents of which are hereby incorporated by reference in its entirety.

FIELD

The disclosure generally relates to a power supply and, particularly but not exclusively, to an adaptive power supply for High Dynamic Range (HDR) devices with high light output peaks.

BACKGROUND

Traditionally, display devices are backlit by one light source covering the whole area using respective optical light guides. Recently, more and more display devices with so called locally dimmed backlighting have appeared on the market. These devices allow a momentary higher light output on specific areas in the picture. With HDR devices, providing a momentary higher light output becomes demanding, as these devices need to reach much higher light output values (e.g. over 1000 nits, 1 nit=1 cd/m$^2$). Unfortunately, current HDR devices are not able to provide a sufficiently higher light output on specific areas of a picture when needed from the main power supply.

What is needed is a method and device for providing sufficient energy to increase the light output of an HDR device.

The present disclosure is directed towards addressing one or more of the aforementioned drawbacks.

SUMMARY

According to a first aspect of the disclosure, a device is described to increase the light output on specific areas of a display apparatus. The display apparatus may be a High Dynamic Range (HDR) device. The device includes a processor and a power source. The processor is configured to process a received content signal. The power source further includes a circuit configured to receive a request signal from the processor and, in response to the received request signal, adjust the power supply limitation that increases a light output on a first area of a display when the content signal is displayed.

In another embodiment, the power source further includes a run mode power source coupled to the circuit and configured to receive the adjusted power output and provide such to at least one of a backlight of the display and an audio system.

In another embodiment, the power source operates between a first power mode and, in response to the request signal, a second power mode, the second power mode providing higher power output capability than the first power mode.

In another embodiment, the run mode power source includes a power source controller and an inductance.

In another embodiment, the power source controller causes the inductance to apply the adjusted power to the display.

In another embodiment, the content signal is one of a broadcast signal, an auxiliary signal and a broadband signal.

In another embodiment, a power factor of the circuit decreases when the power source adjusts the power that increases the light output on the first area of the display.

In another embodiment, an output voltage of the circuit increases upon receipt of the request signal from the processor.

In another embodiment, the circuit includes a power factor controller and modification of an input voltage to the power factor controller decreases a power factor of the circuit and increases the adjusted power of the power source.

In another embodiment, the modification of a feedback voltage to the power factor controller decreases the power factor of said circuit.

In another embodiment, modification of an input signal to the power source controller increases a maximum current in the inductance provided by the power source.

In another embodiment, the processor is connected to a display including an audio processor. A reduction of an amplitude of an input audio signal by the audio processor to the audio system increases the adjusted power provided to the backlight of the display.

According to a second aspect of the disclosure, a method is described for increasing the light output on specific areas of a display apparatus. The method includes processing a received content signal in a processor; receiving a request signal for increased light output to a first area of a display device from the processor, based on the processed content signal; and adjusting a power output from a power source including a circuit to receive a request signal to increase a light output to the first area of the display when the content signal is displayed.

In another embodiment, the power source further includes a run mode power source coupled to the circuit for receiving the adjusted power output and providing such to at least one of a backlight of the display and an audio system.

In another embodiment, the power source operates between a first power mode and, in response to the request signal, a second power mode, the second power mode providing higher power output capability than the first power mode.

In another embodiment, the run mode power source includes a power source controller and an inductance.

In another embodiment, the power source controller causes the inductance to apply the adjusted power to the display.

In another embodiment, the content signal is one of a broadcast signal, an auxiliary signal and a broadband signal.

In another embodiment, a power factor of the circuit decreases when the power source adjusts the power that increases the light output on the first area of the display.

In another embodiment, an output voltage of the circuit increases upon receipt of the request signal from the processor.

In another embodiment, the circuit includes a power factor controller and modification of an input voltage to the power factor controller decreases a power factor of the circuit and increases the adjusted power of the power source.

In another embodiment, modification of a feedback voltage to the power factor controller decreases the power factor of the circuit.

In another embodiment, modification of an input signal to the power source controller increases a maximum current in the inductance provided by the power source.

In another embodiment, the method further comprises reducing an amplitude of an input audio signal to audio systems causing an increase in power provided for backlighting the display.

Some processes implemented by elements of the disclosure may be computer implemented. Accordingly, such elements may take the form of an entirely hardware embodiment, an entirely software embodiment (including firmware, resident software, microcode, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as, an electrical signal, an optical signal, an acoustic signal, a magnetic signal or an electromagnetic signal, e.g., a microwave or RF signal.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

It should be understood, that the drawings are for purposes of illustrating the concepts of the disclosure and are not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with, through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The method and device describe management of Power Factor Correction (PFC) together with the main power supply and other load circuitry.

Figure 1:
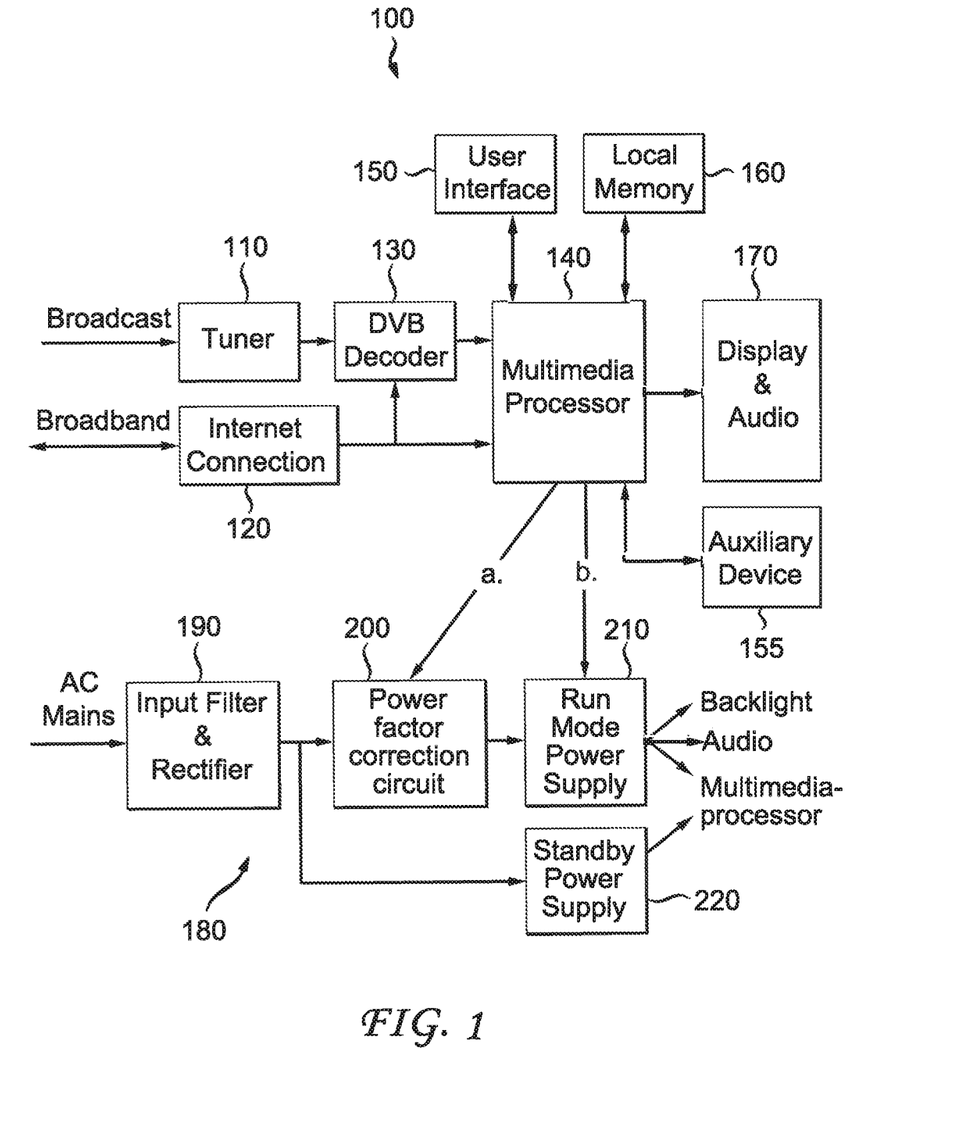
FIG. 1 is an exemplary block diagram of a conventional television having broadcast and broadband connections.

FIG. 1 shows the basic concept of a conventional device 100 having broadcast and broadband connections for receiving audio/video signals, data, HDR-metadata and further services. The device 100 includes a tuner 110 receiving a broadcast signal, a broadband connection port 120, a Digital Video Broadcasting (DVB) decoder 130, a Multimedia processor 140, a user interface 150, an auxiliary device input 155 such as a Blu Ray Player, a memory device 160 and a display 170 including backlight and audio system. The display may be integrally connected to the device or separate from and connected to the device. The device 100 further includes a main power supply 180. The main power supply 180 includes an input filter and rectifier 190 for receiving the AC main power, a power factor correction circuit 200, a run mode power supply 210 and a standby power supply 220. The run mode power supply 210 provides power to the backlight of the display, the audio systems, functional systems 110, 120, 130, 160, 190, auxiliary systems and the multimedia processor 140. The standby power supply 220 provides power to the multimedia processor for powering standby systems of the device 100 during a standby mode of operation.

The tuner 110 may receive broadcast signals and the broadband connection port 120 may be connected to receive broadband signals such as from the internet. The tuner 110 and broadband connection port 120 may be connected to the DVB decoder 130 for decoding received broadcast and broadband signals. The DVB decoder 130 may be connected to provide the decoded signals to the multimedia processor 140. The broadband connection port 120 may also provide broadband signals directly to the multimedia processor 140. The auxiliary device input 155 provides a signal from an auxiliary device such as a Blu Ray Player, Digital Versatile Disk (DVD) device, etc. directly to the multimedia processor 140. The multimedia processor 140 is used in a special standby-mode for managing the standby power and during a run-mode performs processing of the broadcast and broadband signals including HDR enhancement and driving of the User Interface 150. The multimedia processor 140 is connected to the power factor correction circuit 200 and run mode power supply 210 for controlling run mode power as well as HDR enhancement, and standby mode power. The input filter and rectifier 190 may also be connected to the standby power supply 220. Alternatively, the Standby Power Supply 220 may be combined with the run mode power supply 210 as a single power supply device.

The power supply 180 depicted in the lower part of FIG. 1 supplies all the circuitry of the device with power. For standby-operation there is a very low power standby-mode power supply 220 that may be directly connected to most rectifiers, supplying power to the multimedia processor 140 during standby operation. Some devices also have a separate standby micro controller. Traditionally, the power factor correction circuit 200 (which is mandatory in Europe) and the run-mode power supply 210 are turned off via the multimedia processor 140 during standby-operation through connections a and b as shown in FIG. 1. In this embodiment, the multimedia processor may provide control of more than on/off control via connections a and b, as will be explained herein below. The multimedia processor 140 modifies several parameters of the power factor correction circuit 200 and run-mode power supply 210 to obtain better light output performance.

Figure 2:
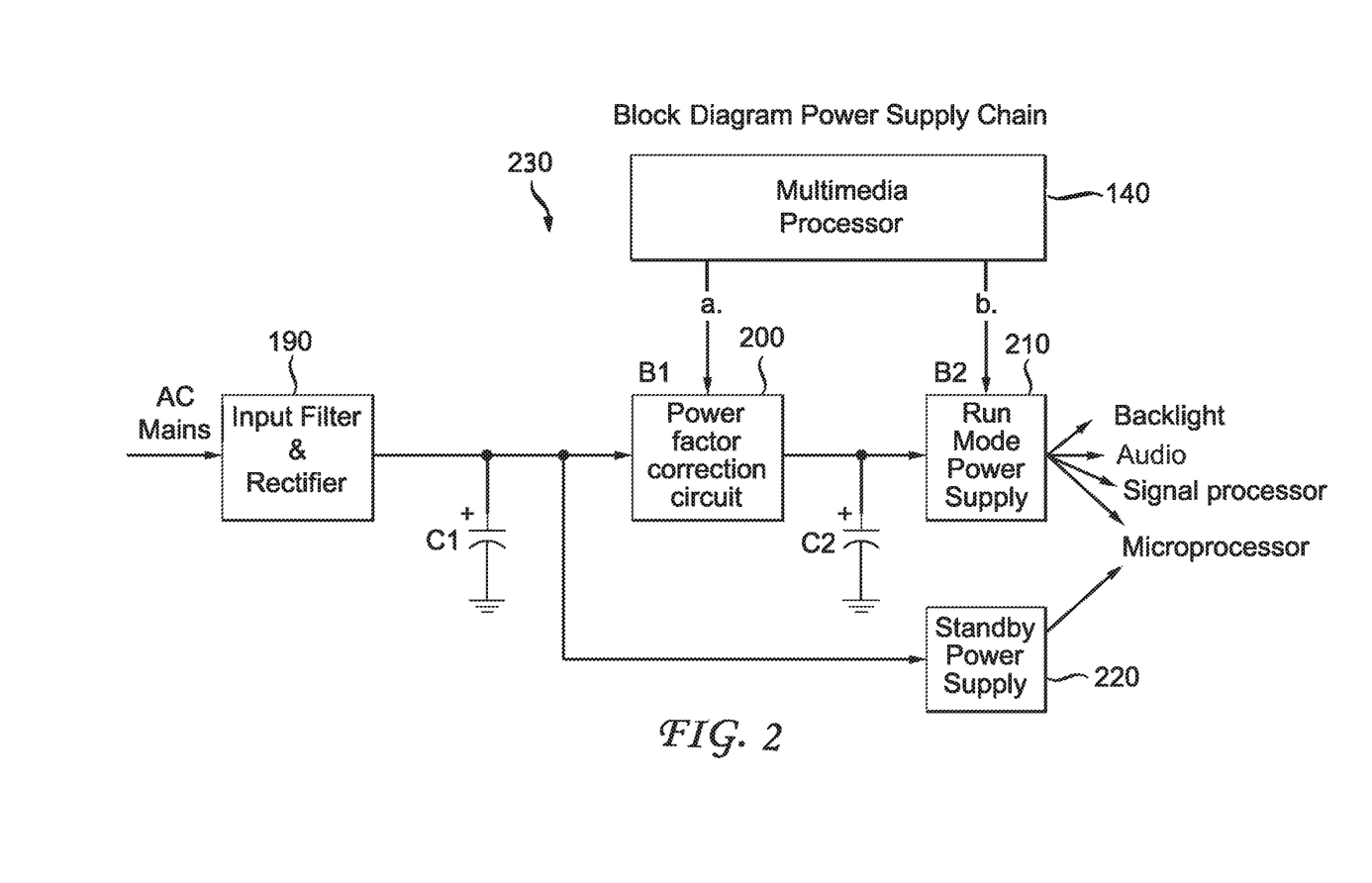
FIG. 2 is a block diagram of a power source in accordance with an embodiment of the present disclosure.

FIG. 2 depicts a power factor corrected power supply chain 230 in accordance with an embodiment of the disclosure. The power factor corrected power supply chain 230 includes two additional capacitors, C1 and C2 from the power supply 180 shown in FIG. 1. The capacitors C1 and C2 may be positioned on either side of the power factor correction circuit 200. Capacitor C1 may be generally in the range of 1 uF and acts substantially similar to an input filter as opposed to a reservoir capacitor. Capacitor C2 acts as a reservoir capacitor and may be generally in the range of 200 uF-1000 uF. The power factor correction circuit 200 is usually a power converter of the up-converting type. Input to the power factor correction circuit 200 may be controlled to provide a considerably sinusoidal input current and the power factor correction circuit 200 may provide a roughly controlled output voltage of about 500V with a strong 100 Hz ripple (USA 120 Hz). The run mode power supply circuit 210 may be either a flyback or forward converter type which provides mains isolation for the different output voltages with little ripple.

Signal a, received by the power factor correction circuit 200 from the multimedia processor 140 may control the voltage at C2. Signal b received by the run mode power supply circuit 210 from the multimedia processor 140 may control the power limitation of the run mode power supply 210. Energy stored in each of C1 and C2 is given by $\frac{1}{2} \ast (V^2 \ast C)$ wherein V is the voltage at the capacitor and C is the capacitance of the capacitor.

Traditional power factor controllers are adjusted between 450V-600V. A manufacturer selects this voltage based on available components or by design and the design of the run mode power supply (see FIG. 1). In the example below, a voltage of 500V is selected. This voltage may be given by a voltage divider R3 and R4 connected to the Fb pin of a power factor controller 420 (see FIG. 4). The calculation below shows how much energy can be provided by an adaptive design to provide additional power to increase light output. The ratio is more impressive adjusting C2 within a range between 400V and 600V. The increase in power supplied may be controlled by signal a and transistor Q4, modifying the feedback (fb) voltage divider.

The complete energy stored in C2 (500V, 220 uF) is $E_{500}=27$ W.
If we allow a lowest voltage at C2 of 400V, an energy of $E=E_{500}-E_{400}=27$ W$-17$ W$=10$ W is available during a short period where the momentary input and thus the sinusoidal current is low (see FIG. 3). If we increase the voltage at C2 to 600V, an energy of $E=E_{600}-E_{400}=40$ W$-17$ W$=23$ W is available. This additional voltage is available to increase energy provided to the backlight for a short period.

The example above explains the reason for a short time increase of energy provided to the backlight. If we use the energy difference from 600V down to 400V (without having a significant power flow from the mains) we can provide energy of 2300 W during a 10 ms period to the display. This additional energy would increase the light output of the HDR device from 500 Nit to 5000 Nit (in a future HDR TV).

If the lighting (e.g. backlight-LED, OLED) is able handle that amount of energy. The increase of the voltage for a short period has to be considered when selecting the voltage of capacitor C2. Due to the lower voltage applied during most of the time, the life time of those capacitors, i.e. the Mean Time Between Failures (MTBF), rises considerably.

Figure 3:
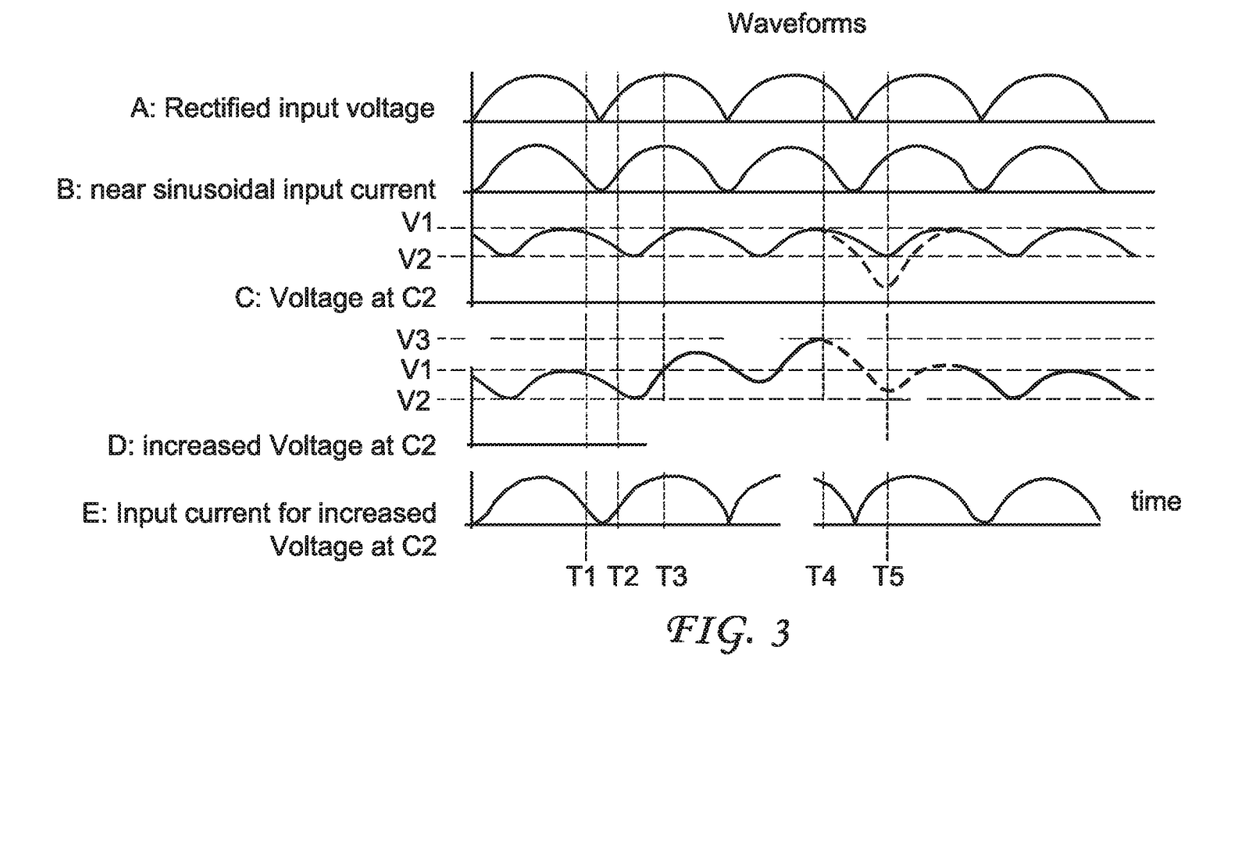
FIG. 3 is an illustration depicting several waveforms at different times during power source operation in accordance with an embodiment of the present disclosure.

FIG. 3 illustrates several waveforms measured from different points in the power factor correction circuit 200. All current curves are enveloping curves of the switched current (switching frequency is about 100 kHz-1 MHz). Waveforms A, B and C show operation according to conventional devices. The waveform labelled A shows a rectified input voltage and waveform B illustrates a near sinusoidal input current after rectification and averaging. Waveform C illustrates the voltage at C2 showing how the voltage floats between V1 and V2 (with a constant load). As can be seen from the waveform, the voltage is decreasing between T1 and T2 because of the lower current being provided from the mains by the power factor corrector. At T3, an unforeseen power request (by the display brightness) is received at time T4. At T4, the voltage begins to drop to a point below V2 at time T5 and the subsequent power supply is not able to provide enough energy to the display. Thus, the HDR effect fails. The present arrangement provides solutions for solving this problem.

One embodiment for increasing the power supplied for increased backlighting is provided by increasing the voltage at C2 upon receipt of an increased power request at time T3 as is shown in waveform D. As can be seen from waveform D, the voltage at C2 increases at T3 upon detection that an increase in power will be needed to provide increased backlighting. This antecedent voltage increase occurs during a high momentary mains voltage at T3 and generally 20 ms or more before the event appears at T4. The antecedent voltage increase at time T3 is not a problem because of the increased time necessary for processing the video signal, in particular with HDR. The antecedent voltage increase could occur in HDR in response to metadata that controls the power factor controller 420 or, in the absence of metadata, by video processing that generates extremely high luminous parts of the screen.

Another embodiment for increasing the power supplied for increased backlighting is provided by reducing the correction factor of the power factor circuit as shown in waveform E. As seen from waveform E, at T3 the correction of the power factor is reduced for a short time. More energy is transferred during the time when momentary $V_{mains}$ is low, thus a ripple of the voltage at C2 is reduced. The gain of this action may be of lesser value than the increase in the capacitor voltage, but the voltage of the capacitor is not stressed. For optimized performance a combination of an antecedent voltage increase, and reduction of the power factor may be useful.

Figure 5:
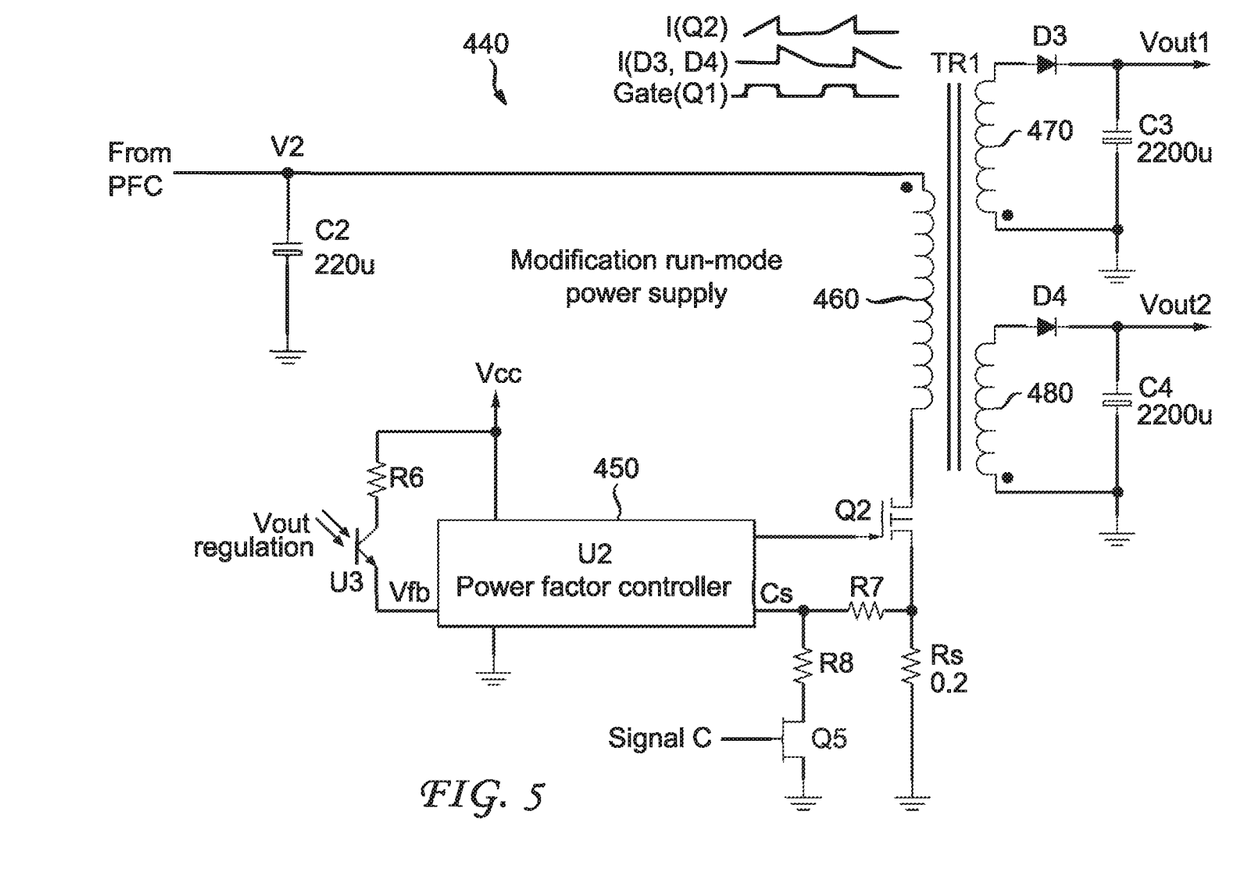
FIG. 5 is a block diagram of a run-mode power supply in accordance with an embodiment of the present disclosure.

A third embodiment for increasing the power supplied for increased backlighting is shown in FIG. 5 which allows a supply of a higher current by the main power supply controller 450 for a short time. In this instance, a current feedback circuit to the power factor controller includes a variable divider or variable reference which essentially "fakes" the power factor controller 420 into detecting a lower current than is actually present at the output of the power factor correction circuit 200 thereby causing a supply of a higher current to the output for a short time. This solution will be discussed in further detail below, with respect to FIG. 5.

A fourth embodiment for increasing the power supplied for increased backlighting reduces power consumption by other parts of the HDR device such as audio systems and audio processing. The display 170 includes an audio processor which reduces an amplitude of an input audio signal to the audio systems, e.g. bass amplification, input signal level, etc. enabling an increase in power provided for backlighting the display. Generally, 80% of the audio signal energy comes from the bass amplification. The reduction of power by the audio processor is performed in a smooth manner and is for a duration that would not produce a noticeable difference in audio sound and quality.

Figure 4:
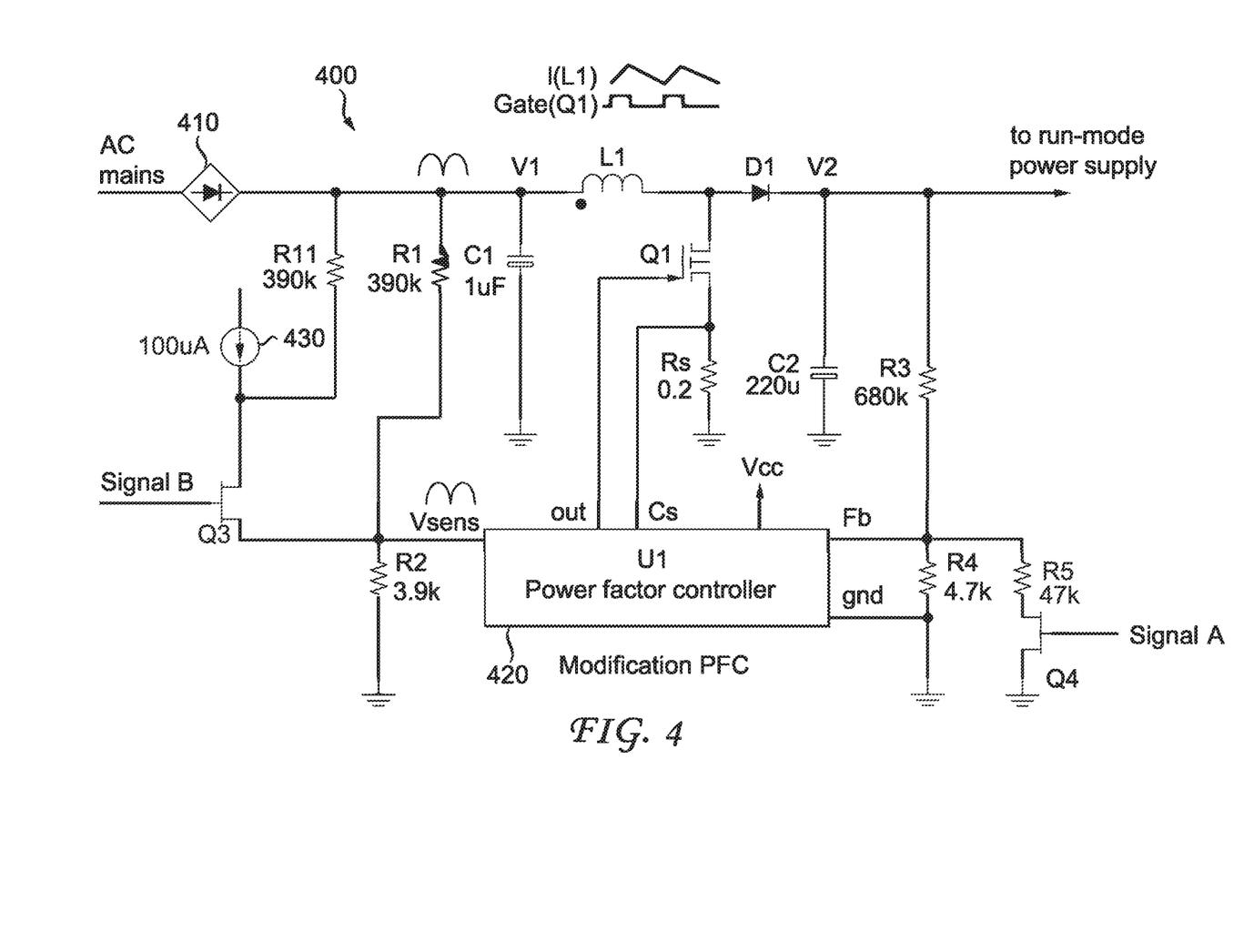
FIG. 4 is a block diagram of a power factor controller in accordance with an embodiment of the present disclosure.

FIG. 4 shows the power factor correction circuit 400 in accordance with an embodiment of the disclosure. The power factor correction circuit 400 increases output voltage and power transfer capability during periods of low momentary mains voltage. The displayed converter is of an up-converting type.

In the power factor correction circuit 400, the mains supply may be fed via a rectifying bridge 410 to a capacitor C1. The capacitor C1 is preferably small, having a maximum capacitance of 1 uF. An inductor L1 may be connected between the capacitor C1 and a transistor Q1. Transistor Q1 may be one of a MOSFET type, a bipolar type or a combination thereof. The transistor Q1 may be connected to the power factor controller 420. The power factor controller 420 includes an output port connected to a gate of the transistor Q1 for periodically closing the transistor Q1, producing a current in inductor L1. The current produced in inductor L1 rises linearly with time. The current is measured via a resistor Rs connected to a source of transistor Q1 and the current sense input Cs of power factor controller 420. When the measured current matches an internally created threshold, transistor Q1 is opened and the energy is transferred via a diode D1 to point V2, charging a capacitor C2. The voltage at capacitor C2 is controlled via a feedback loop including resistors R3, R4, and a feedback input Fb to the power factor controller 420. Voltage V2 is measured by voltage divider resistors R3 and R4. The voltage at Fb is used by the power factor controller 420 for varying the maximum current in L1 by changing the on-time of Q1 and thereby the charge of capacitor C1.

An internal threshold for the current is derived from the voltage $V_{sens}$ applied at an input to power factor controller 420 that is a scaled value of the rectified mains voltage. The internal threshold is scaled by resistors R1 and R2 connected to input $V_{sens}$. This voltage is used to make the average current flowing in inductor L1 nearly sinusoidal. Power factor controller 420 may include other pins for performing other functions. However, these pins are not shown in FIG. 4 as they are not relevant to the disclosure.

With respect to feedback input Fb, by modifying the voltage divider, R3 and R4, the output voltage V2 is increased when signal A is applied by the multimedia processor 140 to a transistor Q4, turning transistor Q4 on and thereby connecting resistor R5 in parallel with resistor R4. Applying signal A to transistor Q4 will change feedback input Fb to the power factor controller 420 and cause the power factor controller 420 to vary the duty-cycle of transistor Q1 off and thereby increase output voltage V2. For example, increasing output voltage V2 by 20% will create a boost of about 44% in energy for this time. Signal A is generally applied upon determination that increased backlight is needed by the display. This determination usually occurs prior to processing of the content signal and approximately 10 msec before the increased backlight is needed. The application of signal A to turn on transistor Q4 in advance of needing the increased power provides sufficient time for capacitor C2 to be charged, while the content signal is being processed prior to display thereof.

With respect to $V_{sens}$, modifying input $V_{sens}$ suppresses the making of a perfect power factor correction and thus enables increased power transfer to C2 during the low mains voltage period. Due to this energy transfer to C2, the voltage drop at C2 is reduced and more power can be taken for the run-mode power supply. A current source 430 may be connected to a common point of the voltage divider between R1 and R2. Adding a small current, e.g., 100 uA, by the current source 430 to the common point of the voltage divider R1 and R2 causes a higher voltage to appear at $V_{sens}$ of the power factor controller 420 and thus the internal calculation for a sinusoidal current, outputs a higher threshold for the current in Q1. This 100 uA current appears as an input voltage of plus 39V to the power factor controller 420. It may be advantageous if, instead of a constant current, or in combination with the constant current, a modulated current is fed to pin $V_{sens}$ by simply connecting a shunt resistor R11 in parallel to R1 via transistor Q3. When using resistor R11, signal B must also be intermitted when V1 is high.

FIG. 5 illustrates the run mode power supply 440 for applying the modified higher current output for a short time to the mains power supply. FIG. 5 shows use of a flyback configuration. However, this configuration is shown for purposes of example and other configurations able to provide the modified higher current output over a short period may also be used. The power factor controller 420 (shown in FIG. 4) is connected to the input of the run mode power supply and applies a voltage to point V2 to charge capacitor C2. The current flows into the main inductor 460 causing it to ramp up and close transistor Q2. Resistor Rs measures the ramping current in transistor Q2. The ramping voltage measured at Rs is provided to the input Cs of the power supply controller 450. When the voltage measured by resistor Rs reaches a threshold, the power supply controller turns off transistor Q2 causing the current in the main inductor 460 to flow through inductor 470 and diode D3 and inductor 480 and diode D4. The number of secondary side windings 470 and 480 is not limited to two. Because the secondary voltages are tracking, usually one of the secondary side voltages is measured and compared with a reference and the signal fed back via an opto-coupler U3 to the power supply controller. This feedback signal Vfb together with the current sense signal Cs is used for controlling the duty-cycle of Q2 in a closed loop such that the secondary voltage is constant, in case additional energy is provided to the secondary side. Signal C is applied to transistor Q5 and shunts part of the current through transistor Q2 to ground causing the power supply controller 450 to detect a smaller current. In order for a higher current to be transferred, the voltage measured at Rs is scaled by R7 and R8 as soon as the signal is applied. This is done while signal C is applied by the multimedia processor 140 to transistor Q5. Transistor Q2 may be one of a MOSFET type, a bipolar type or a combination thereof.

HDR displays using HDR metadata will soon be widely used. It is a relative simple task to analyze content signals for metadata indicating when additional energy is needed for increasing backlight on the display. In case of movies not having metadata, most manufacturers calculate some HDR-like pictures and provide information regarding when additional backlight is needed. The multimedia processor is enabled to determine how to provide the additional power required to increase the backlight for the display.

Figure 6:
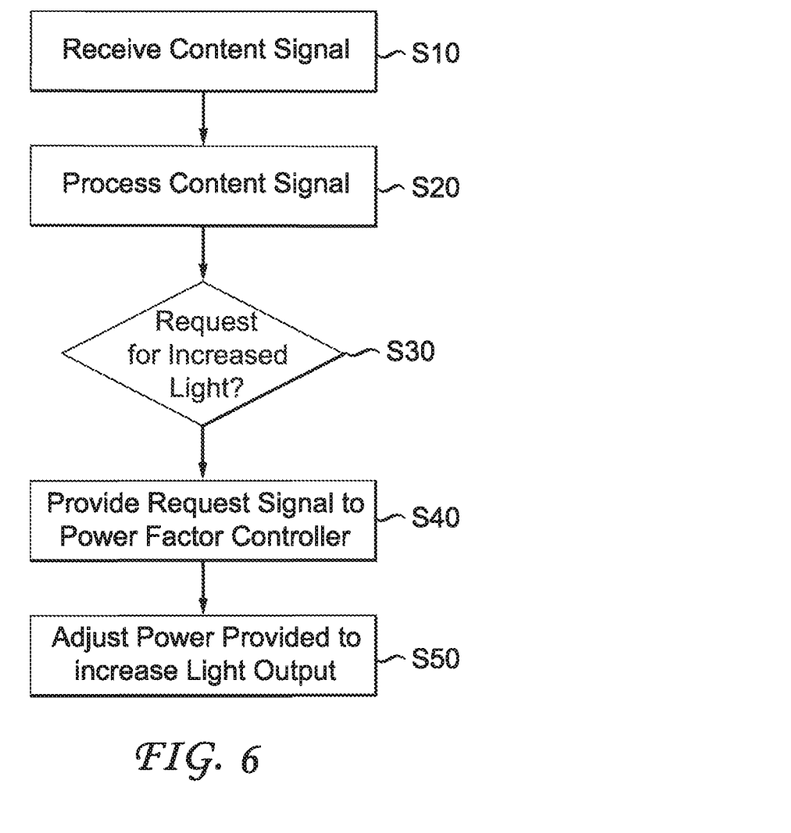
FIG. 6 is a flow diagram depicting a method for increasing the light output on specific areas of a display apparatus in accordance with an embodiment of the present disclosure.

FIG. 6 is a flow chart illustrating the method performed by the device to adapt the main voltage to provide an increased voltage and thereby providing a momentary higher light output by a display. In step S10, a content signal is received. The content signal is decoded and processed by a processor in step S20. In step S30, a determination is made as to whether the content signal includes a request for increased light output on at least an area of the display. If a request for increased light output is not detected, the device continues to process the content signal. If a request for increased light output is detected, a request is provided to a power factor controller of the main power supply by the processor in step S40. The power factor controller adjusts the power provided to a display for increasing the light output in response to receipt of the request signal in step S50.

Transistors Q3, Q4 and Q5, controlled by the signals A, B and C, may be any type of semiconductor such as a bipolar transistor, a MOSFET transistor or provided internally of controllers 420 and 450 in form of a logic circuit or implemented software.

Although embodiments which incorporate the teachings of the disclosure have been shown and described in detail herein, those skilled in the art can readily devise many other varied embodiments that still incorporate these teachings. Having described preferred embodiments of a system and method for enhancing content (which are intended to be illustrative and not limiting), it is noted that modifications and variations can be made by persons skilled in the art in light of the above teachings. It is therefore to be understood that changes may be made in the particular embodiments of the disclosure disclosed, which are within the scope of the disclosure as outlined by the appended claims.

The invention claimed is:

1. A device, comprising:
 a processor configured to process a received content signal; and
 a power source including a circuit configured to receive a request signal from the processor and, in response to the received request signal, adjust a power supply limitation that increases a light output on a first area of a display when the content signal is displayed,
 wherein the processor is coupled to a display including an audio processor, wherein reduction of an amplitude of an input audio signal by the audio processor increases the adjusted power provided to the backlight of the display.

2. The device according to claim 1, wherein the power source further includes a run mode power source coupled to said circuit and configured to receive the adjusted power output and provide such to at least one of a backlight of the display and an audio system.

3. The device according to claim 1, wherein said power source operates between a first power mode and, in response to the request signal, a second power mode, said second power mode providing higher power output capability than said first power mode.

4. The device according to claim 2, wherein said run mode power source includes a power source controller and an inductance.

5. The device according to claim 4, wherein upon receipt of said adjusted power, said power source controller causes said inductance to apply said adjusted power to said display.

6. The device according to claim 1, wherein the content signal is one of a broadcast signal, an auxiliary signal and a broadband signal.

7. The device according to claim 1, wherein a power factor of the circuit decreases when the power source adjusts the power that increases the light output on said first area of the display.

8. The device according to claim 7, wherein an output voltage of the circuit increases upon receipt of the request signal from the processor.

9. The device according to claim 1, wherein the circuit includes a power factor controller and modification of an input voltage to the power factor controller decreases a power factor of said circuit and increases the adjusted power of the power source.

10. The device according to claim 9, wherein modification of a feedback voltage to the power factor controller decreases the power factor of said circuit.

11. The device according to claim 4, wherein modification of an input signal to said power source controller increases a maximum current in the inductance provided by the power source.

12. A method, comprising:

processing a received content signal in a processor;

receiving a request signal for increased light output to a first area of a display from the processor based on the processed content signal;

adjusting a power output from a power source including a circuit to receive a request signal to increase a light output to the first area of the display when the content signal is displayed; and reducing an amplitude of an input audio signal to audio systems causing an increase in power provided for backlighting the display.

13. The method according to claim 12, wherein the power source further includes a run mode power source coupled to said circuit and configured to receive the adjusted power output and provide such to at least one of a backlight of the display and an audio system.

14. The method according to claim 12, wherein said power source operates between a first power mode and, in response to the request signal, a second power mode, said second power mode providing higher power output capability than said first power mode.

15. The method according to claim 13, wherein said run mode power source includes a power source controller and an inductance.

16. The method according to claim 15, wherein upon receipt of said adjusted power, said power source controller causes said inductance to apply said adjusted power to said display.

17. The method according to claim 12, wherein the content signal is one of a broadcast signal, an auxiliary signal and a broadband signal.

18. The method according to claim 12, wherein a power factor of the circuit decreases when the power source adjusts the power that increases the light output on said first area of the display.

19. The method according to claim 18, wherein an output voltage of the circuit increases upon receipt of the request signal from the processor.

20. The method according to claim 12, wherein the circuit includes a power factor controller and modification of an input voltage to the power factor controller decreases a power factor of said circuit and increases the adjusted power of the power source.

21. The method according to claim 20, wherein modification of a feedback voltage to the power factor controller decreases the power factor of said circuit.

22. The method according to claim 15, wherein modification of an input signal to said power source controller increases a maximum current in the inductance provided by the power source.

23. A computer program product for a programmable apparatus, the computer program product comprising a sequence of instructions for implementing a method according to claim 12, when loaded into and executed by the programmable apparatus.

* * * * *